US011336146B2

(12) United States Patent
Yamaguchi et al.

(10) Patent No.: US 11,336,146 B2
(45) Date of Patent: May 17, 2022

(54) MOTOR

(71) Applicant: Nidec Corporation, Kyoto (JP)

(72) Inventors: Yuhei Yamaguchi, Kyoto (JP);
Ryusuke Sato, Kyoto (JP); Hisashi Fujihara, Kyoto (JP); Keigo Nakamura, Kyoto (JP)

(73) Assignee: NIDEC CORPORATION, Kyoto (JP)

( * ) Notice: Subject to any disclaimer, the term of this patent is extended or adjusted under 35 U.S.C. 154(b) by 16 days.

(21) Appl. No.: 17/088,642

(22) Filed: Nov. 4, 2020

(65) Prior Publication Data

US 2021/0050760 A1 Feb. 18, 2021

Related U.S. Application Data

(63) Continuation of application No. 16/316,634, filed as application No. PCT/JP2017/030474 on Aug. 25, 2017, now Pat. No. 10,923,981.

(60) Provisional application No. 62/379,873, filed on Aug. 26, 2016.

(51) Int. Cl.
| | |
|---|---|
| *H02K 3/50* | (2006.01) |
| *H02K 5/22* | (2006.01) |
| *H02K 11/27* | (2016.01) |
| *H02K 3/52* | (2006.01) |
| *H02K 3/28* | (2006.01) |
| *H02K 3/38* | (2006.01) |
| *H02K 5/173* | (2006.01) |

(52) U.S. Cl.
CPC ............. *H02K 3/522* (2013.01); *H02K 3/28* (2013.01); *H02K 3/38* (2013.01); *H02K 3/50* (2013.01); *H02K 5/1735* (2013.01); *H02K 5/225* (2013.01); *H02K 2203/09* (2013.01)

(58) Field of Classification Search
CPC ............. H02K 3/50; H02K 5/24; H02K 11/27
USPC ........................................... 310/43, 68 R, 71
See application file for complete search history.

(56) References Cited

U.S. PATENT DOCUMENTS

| 4,132,460 A * | 1/1979 | Porta .................... H01R 4/2462 |
| | | 310/71 |
| 2005/0118886 A1* | 6/2005 | Cha ........................ H02K 5/225 |
| | | 439/810 |

FOREIGN PATENT DOCUMENTS

| JP | 55131246 A * | 10/1980 | ............. H02K 3/522 |
| JP | 2016063564 A * | 4/2016 | |

OTHER PUBLICATIONS

Yamaguchi et al., "Motor", U.S. Appl. No. 16/316,634, filed Jan. 10, 2019.

* cited by examiner

*Primary Examiner* — Jose A Gonzalez Quinones
(74) *Attorney, Agent, or Firm* — Keating & Bennett

(57) ABSTRACT

A motor includes a rotor including a shaft centered on a vertically extending center axis, a stator radially opposite to the rotor and including coils, a bearing supporting the shaft, and a bus bar assembly on an upper side in an axial direction of the stator. The bus bar assembly includes bus bars including a terminal portion connected to a lead wire drawn out from the coil and a bus bar holder holding the bus bars. The terminal portion includes a slit which extends axially downward and into which the lead wire is fitted. The width of the slit is narrower than the diameter of the lead wire.

11 Claims, 10 Drawing Sheets

MOTOR

BACKGROUND OF THE INVENTION

1. Field of the Invention

The present invention relates to a motor.

2. Description of the Related Art

Japanese Laid-Open Patent Publication No. 2005-130586 discloses a structure of a wire connection process in a stator of an electric motor. The stator includes a stator core having a plurality of magnetic pole teeth along an inner circumferential portion and a winding wound directly around each magnetic pole tooth of the stator core via an insulating member. At one end surface of the stator core, a cavity integrally molded with the insulating member and serving as a wire receiving portion is disposed. An insulation displacement terminal having a conduction groove is inserted in the cavity, and the winding and the crossover wire or the lead wire are electrically connected. Specifically, since the winding and the insulation displacement terminal are conducted and the lead-side crossover wire and the insulation displacement terminal are conducted, the winding and the lead-side crossover wire are connected. Likewise, the winding and the neutral point-side crossover wire are in a connected state by the insulation displacement terminal.

In the connection processing structure disclosed in Japanese Laid-Open Patent Publication No. 2005-130586, it is necessary that the insulation displacement terminals are separately inserted for each cavity so as to connect the winding with the lead-side crossover wire or the neutral point-side crossover wire. For this reason, there is a concern that the man-hours required for manufacturing the electric motor may be increased.

SUMMARY OF THE INVENTION

A motor according to an exemplary embodiment of the present invention includes a rotor including a shaft centered on a vertically extending center axis, a stator disposed radially opposite to the rotor and including a plurality of coils, a bearing supporting the shaft, and a bus bar assembly disposed on an upper side in the axial direction of the stator. The bus bar assembly includes a plurality of bus bars including a terminal portion connected to a lead wire drawn out from the coil and a bus bar holder holding the plurality of bus bars. The terminal portion includes a slit which extends axially downward and into which the lead wire is fitted. The width of the slit is narrower than the diameter of the lead wire.

An exemplary embodiment of the present invention provides a technique capable of improving manufacturing efficiency of a motor including a bus bar.

The above and other elements, features, steps, characteristics and advantages of the present invention will become more apparent from the following detailed description of the preferred embodiments with reference to the attached drawings.

DETAILED DESCRIPTION OF THE PREFERRED EMBODIMENTS

Hereinafter, exemplary embodiments of the present invention will be described in detail with reference to the drawings.

In the present description, the direction parallel to a center axis A of a motor 1 is referred to as the "axial direction", the direction perpendicular to the center axis A of the motor 1 is referred to as the "radial direction", and the direction along a circular arc with the center axis A of the motor 1 as the center thereof is referred to as the "circumferential direction".

Figure 2:
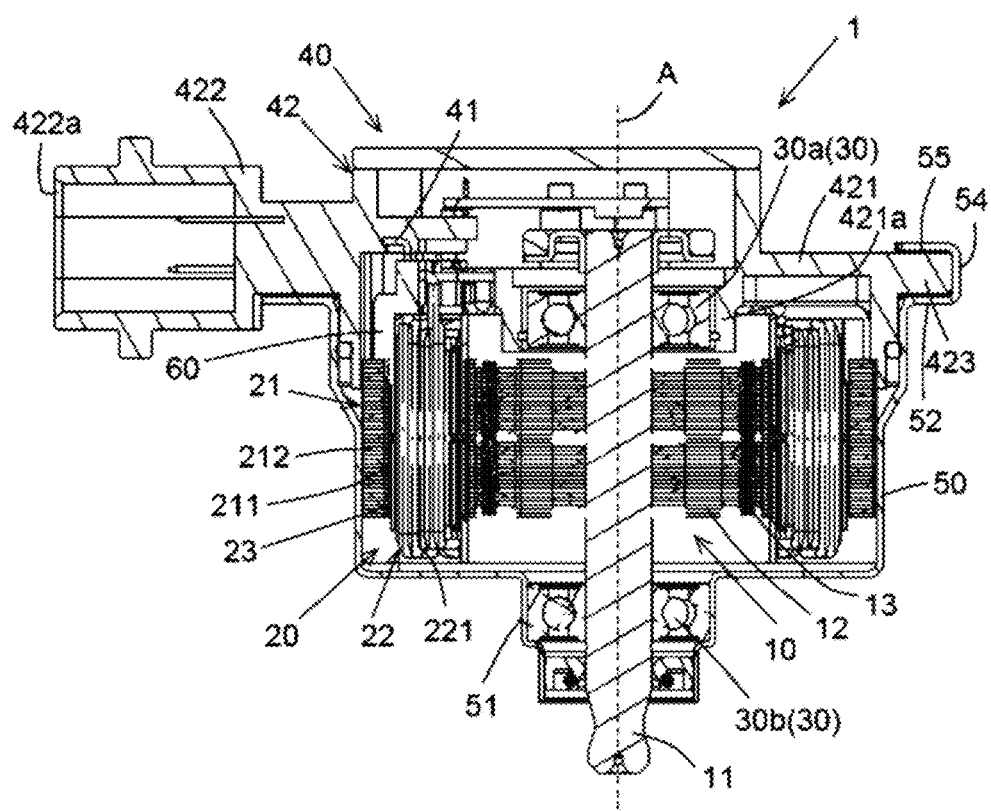
FIG. 2 is a vertical sectional view of a motor according to an exemplary embodiment of the present invention.

In the present description, the axial direction when the motor 1 is disposed in the direction shown in FIG. 2 is defined as the vertical direction. The vertical direction is merely a name used for explanation and does not limit the actual positional relationship and direction.

<1. Schematic Configuration of Motor>

Figure 1:
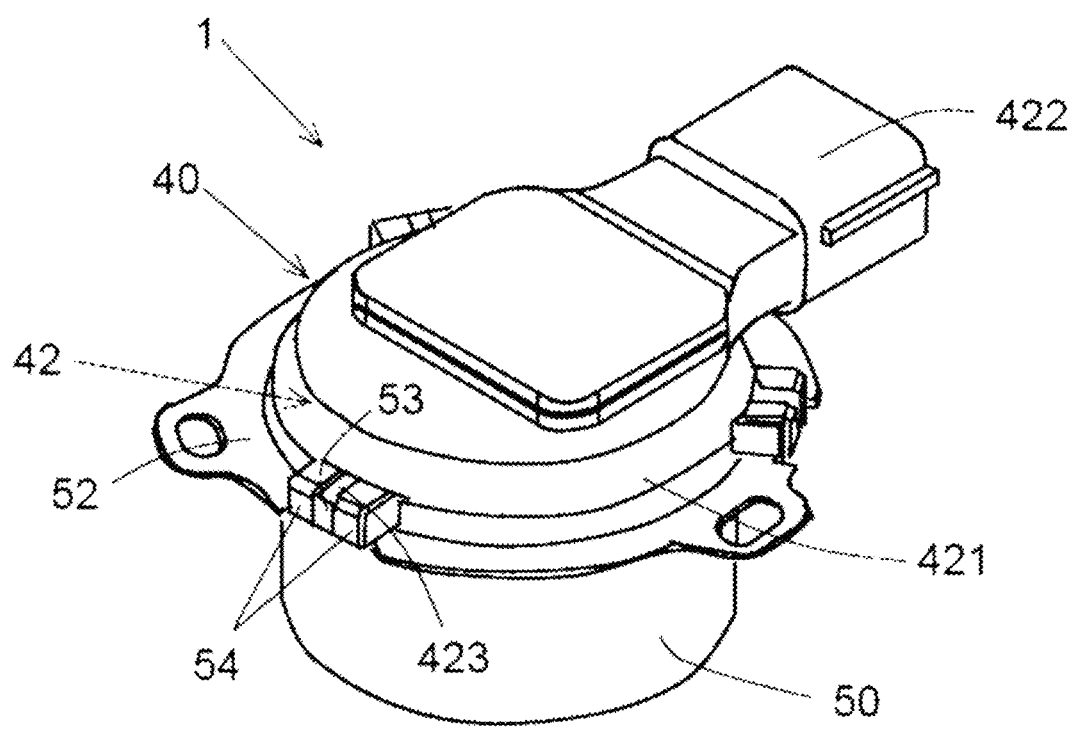
FIG. 1 is a schematic perspective view of a motor according to an exemplary embodiment of the present invention.

FIG. 1 is a schematic perspective view of the motor 1 according to an embodiment of the present invention. FIG. 2 is a vertical sectional view of the motor 1 according to an embodiment of the present invention. As shown in FIG. 1 and FIG. 2, the motor 1 has a rotor 10, a stator 20, a bearing 30, a bus bar assembly 40, a housing 50, and an intermediate member 60.

As shown in FIG. 2, the rotor 10 has a shaft 11 centered on the center axis A extending in the vertical direction. The shaft 11 is circular in plan view from the axial direction. The shaft 11 may be columnar or tubular. The shaft 11 is made of a metal. In addition to the shaft 11, the rotor 10 includes a rotor core 12 and a magnet 13.

The rotor core 12 is cylindrical. The rotor core 12 is disposed radially outside of the shaft 11. The rotor core 12 has a configuration in which a plurality of magnetic steel plates are laminated in the axial direction. However, the rotor core 12 may be, for example, a sintered body obtained by sintering a magnetic material or the like. The shaft 11 is, for example, fixed to the rotor core 12 by press-fitting into the center portion of the rotor core 12. A plurality of magnets 13 are disposed radially outside of the rotor core 12. The plurality of magnets 13 are arranged in the circumferential direction. The magnet 13 is a permanent magnet for a field, and may be, for example, a sintered magnet, a bonded magnet, or the like.

Figure 3:
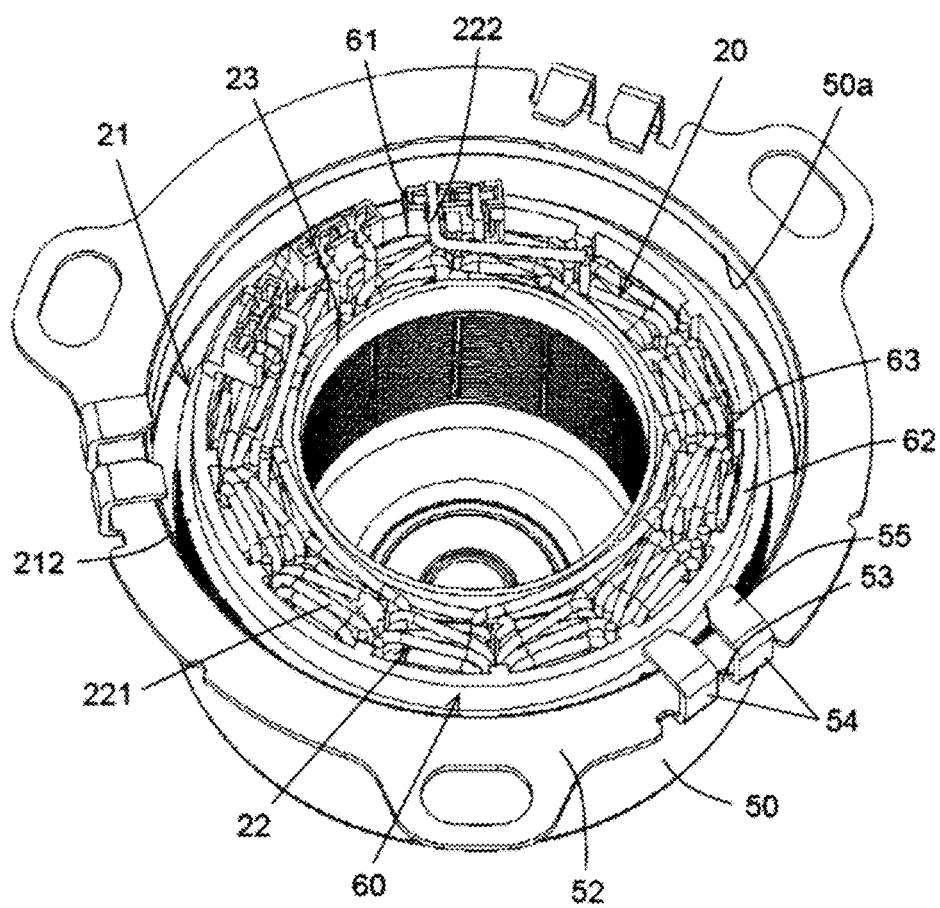
FIG. 3 is a perspective view of the motor shown in FIG. 1 with the rotor and the bus bar assembly removed.

FIG. 3 is a perspective view of the motor 1 shown in FIG. 1 with the rotor 10 and the bus bar assembly 40 removed. With reference to FIG. 2 and FIG. 3, the stator 20 will be described. The stator 20 is disposed to face the rotor 10 in the radial direction. In the present embodiment, the stator 20 is provided in a substantially annular shape and is disposed radially outside of the rotor 10. However, the stator 20 may be disposed radially inside of the rotor 10. In this case, the rotor needs to be changed from the configuration of the present embodiment, and it is configured, for example, in a cup shape. The stator 20 is an armature of the motor 1. The stator 20 includes a stator core 21, a plurality of coils 22, and an insulator 23.

The stator core 21 is annular. The stator core 21 includes a plurality of teeth 211 arranged in the circumferential direction and an annular core back 212. In other words, the stator 20 has the plurality of teeth 211 arranged in the circumferential direction and the annular core back 212. A conductive wire 221 constituting the coil 22 is wound around each of the teeth 211. In detail, the conductive wire 221 is wound around each of the teeth 211 via the insulator 23. The core back 212 is positioned radially outside of the plurality of teeth 211.

The insulator 23 is disposed between the coil 22 and the teeth 211 around which the conductive wire 221 constituting the coil 22 is wound. The insulator 23 is an insulating member that electrically insulates the stator core 21 and the coil 22. By supplying the drive current to the coil 22, a magnetic flux in the radial direction is generated in the teeth 211 which are magnetic cores. As a result, a circumferential torque is generated in the rotor 10, and the rotor 10 rotates around the center axis A.

Figure 4:
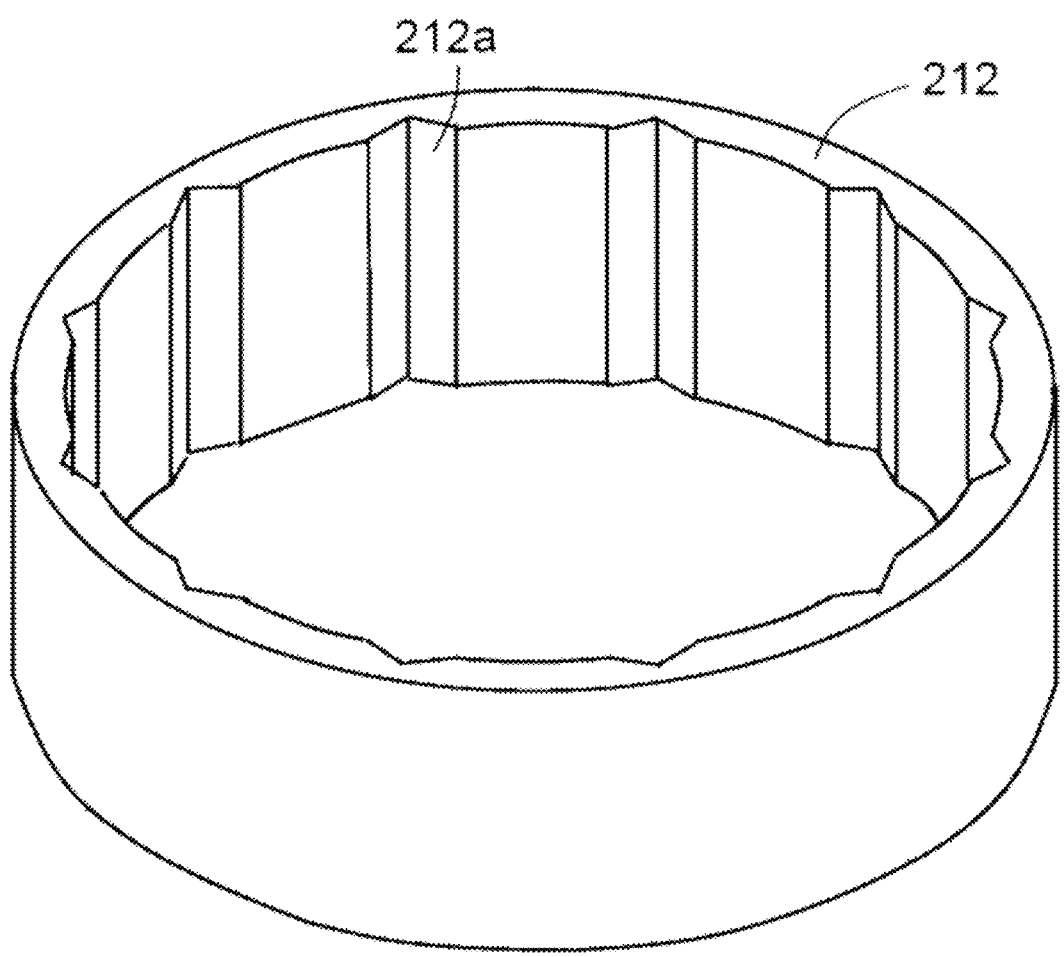
FIG. 4 is a schematic perspective view of a core back included in a stator core according to an exemplary embodiment of the present invention.
Figure 5:
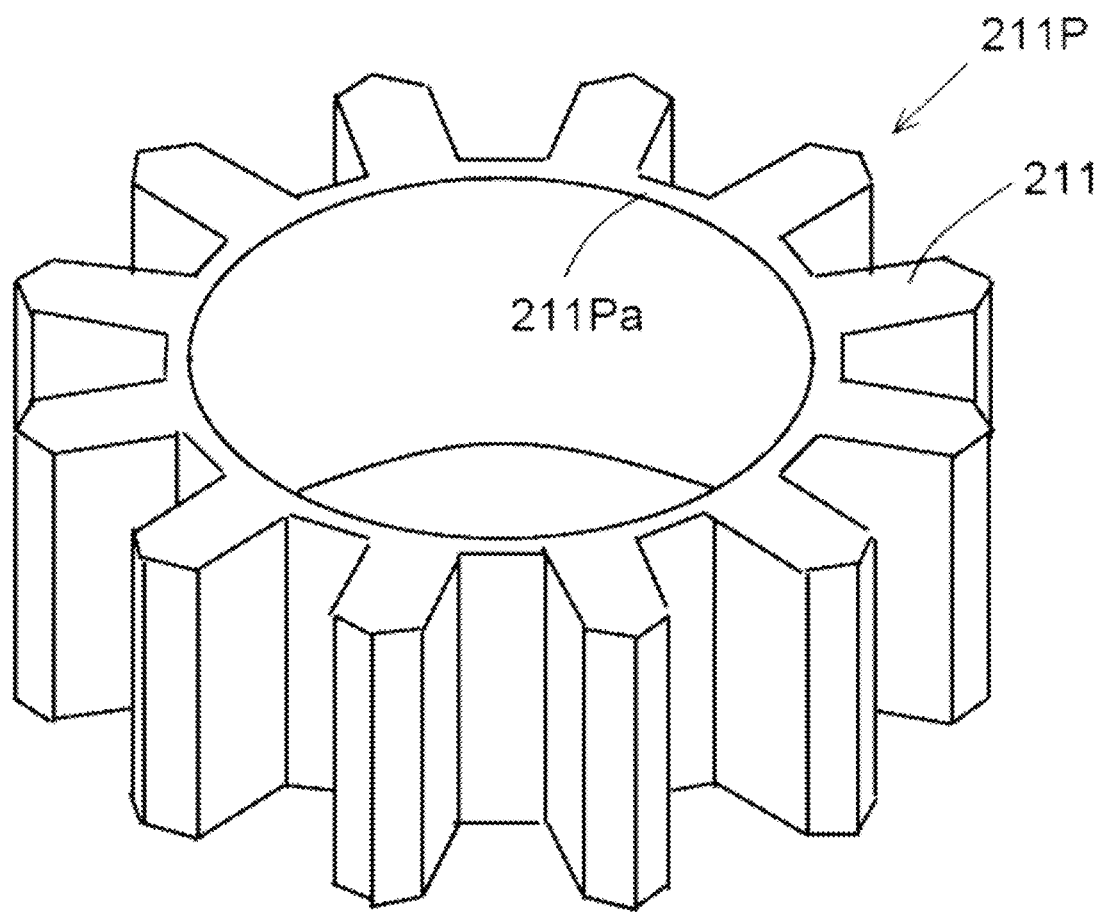
FIG. 5 is a schematic perspective view of a tooth portion included in a stator core according to an exemplary embodiment of the present invention.

Here, a method of manufacturing the stator 20 will be described. FIG. 4 is a schematic perspective view of the core back 212 included in the stator core 21 according to an embodiment of the present invention. FIG. 5 is a schematic perspective view of a tooth portion 211P included in the stator core 21 according to an embodiment of the present invention. As shown in FIG. 4 and FIG. 5, the stator core 21 has the core back 212 and the tooth portion 211P which are members separated from each other. The stator core 21 is configured by combining the core back 212 and the tooth portion 211P. In the present embodiment, the core back 212 has a plurality of core back recesses 212a recessed radially outward on the inner circumferential surface. Each of the core back recesses 212a extends from the upper surface to the lower surface of the core back 212. The plurality of core back recesses 212a are arranged in the circumferential direction. The number of the core back recesses 212a is the same as the number of the teeth 211 included in the tooth portion 211P. The core back 212 and the tooth portion 211P are combined by fitting the distal end portion of radially outside of each of the teeth 211 of the tooth portion 211P into the core back recess 212a.

The method of manufacturing the stator 20 includes a step (a) of preparing the core back 212. For example, the core back 212 is formed by laminating a plurality of annular magnetic steel plates. As another example, the core back 212 may be formed by sintering a magnetic material.

The method of manufacturing the stator 20 includes a step (b) of preparing the tooth portion 211P. The tooth portion 211P has the plurality of teeth 211 arranged in the circumferential direction. The tooth portion 211P has an annular coupling portion 211Pa that connects the radially inner end portions of the teeth 211 that are adjacent in the circumferential direction. For example, the tooth portion 211P is formed by laminating a plurality of magnetic steel plates. As another example, the tooth portion 211P may be formed by sintering a magnetic material.

Figure 6:
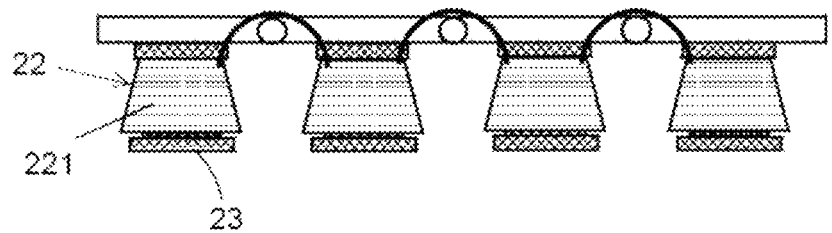
FIG. 6 is a schematic diagram for explaining a step (c).

The method of manufacturing the stator 20 has a step (c) of winding the conductive wire 221 around the insulator 23 in order to form the coil 22. FIG. 6 is a schematic diagram for explaining the step (c). The step (c) is carried out, for example, using a nozzle winding machine. As shown in FIG. 6, when the conductive wire 221 is wound around the insulator 23, the plurality of insulators 23 are linearly disposed. As a result, it becomes easy to wind the conductive wire 221 around each of the insulators 23, and it is possible to easily form the plurality of coils 22. Further, in the present embodiment, the coil 22 has three types of coils, a U-phase coil, a V-phase coil, and a W-phase coil. The number of the coils 22 of each phase is the same and is plural. As an example, the number of the coils 22 of each phase is four. The step of winding the conductive wire 221 around the insulator 23 to form the coil 22 is carried out separately for each phase. That is, three sets of coil groups integrated with the insulator 23 are prepared.

The steps (a), (b), and (c) may be carried out in order, but they may be carried out in parallel at the same time. If the steps (a), (b), and (c) are carried out in order, the order is not particularly limited and may be started from any step.

Figure 7:
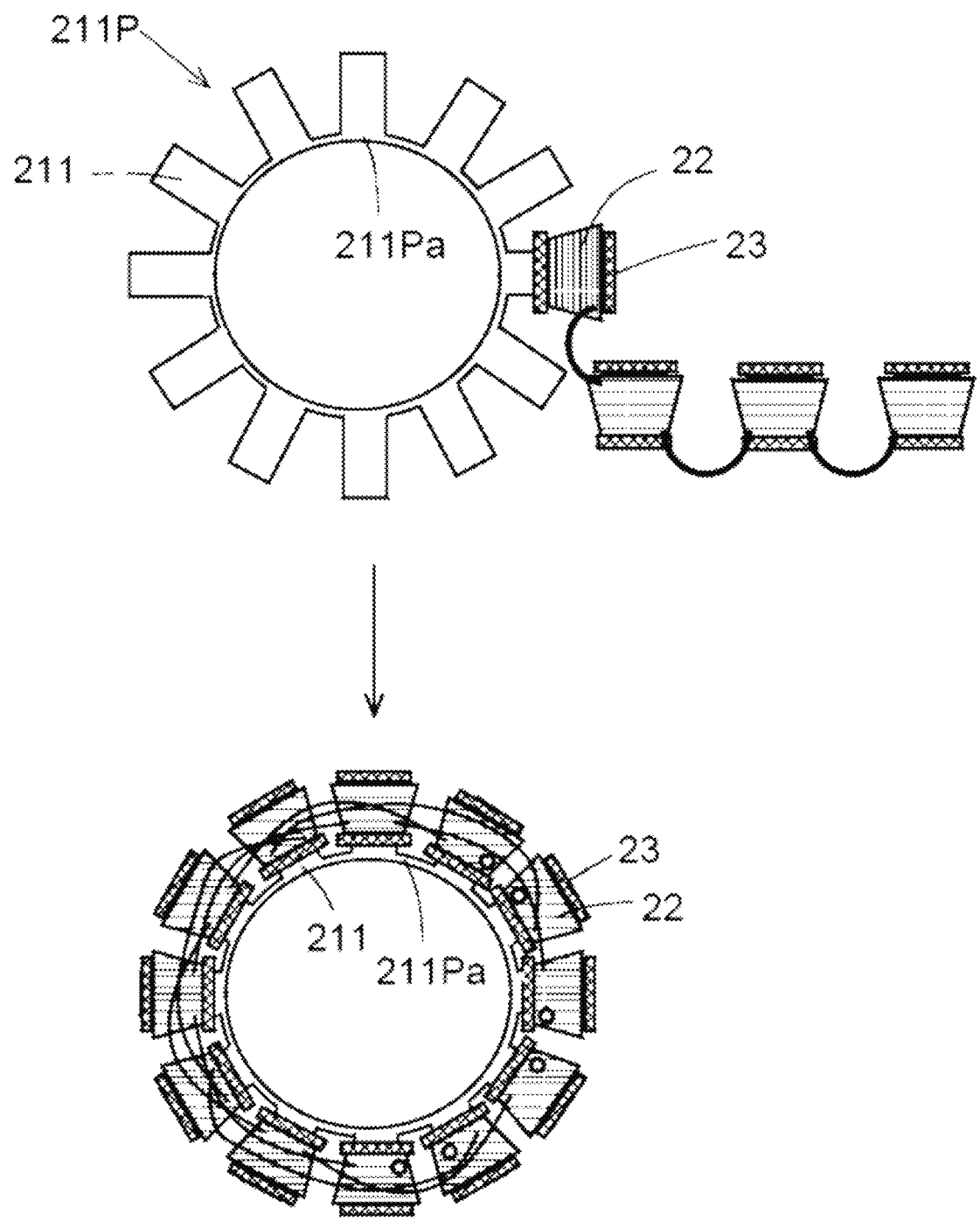
FIG. 7 is a schematic diagram for explaining a step (d).

The method of manufacturing the stator 20 includes a step (d) of attaching the insulator 23 with the conductive wire 221 wound thereon to the tooth portion 211P. FIG. 7 is a schematic diagram for explaining the step (d). In the present embodiment, as described above, the three sets of coil groups integrated with the insulator 23 are prepared. These three sets are sequentially attached to the tooth portion 211P. In the present embodiment, the U-phase coil, the V-phase coil, and the W-phase coil are attached to the tooth portion 211P of the insulator 23 so as to be repeatedly arranged in the circumferential direction in this order. More specifically, in each set, the insulator 23 is attached to every three teeth 211 arranged in the circumferential direction. When being attached, each of the tubular insulators 23 is inserted into each of the teeth 211 from radially outside.

The method of forming the coil 22 described above is merely an example. For example, after the insulator 23 is attached to the tooth portion 211P first, the coil 22 may be formed by winding the conductive wire 221 around the insulator 23. Although the insulator 23 is divided into a plurality of insulators 23 in the present embodiment, the number of the insulators 23 may be integrated into one or a plurality of insulators less than the number of them in the embodiment.

The method of manufacturing the stator 20 includes a step (e) of combining the tooth portion 211P with the conductive wire 221 wound thereon and the core back 212. In the present embodiment, the core back 211 is disposed in a position surrounding the tooth portion 211P. That is, the core back 211 is disposed radially outside of the tooth portion 211P. A part of the inner circumferential surface of the core back 211 is fixed in contact with the tooth portion 211P. The fixing method may be, for example, press fitting, adhesion, or the like.

As shown in FIG. 2, the bearing 30 supports the shaft 11. The bearing 30 is disposed radially outside of the shaft 11. Specifically, the motor 1 has an upper bearing 30a and a lower bearing 30b, which are disposed at intervals in the axial direction. The upper bearing 30a is located above the rotor core 12. The lower bearing 30b is located below the rotor core 12. The shaft 11 is rotatably supported by these two bearings 30a and 30b. In the present embodiment, the two bearings 30a and 30b are ball bearings. However, the number and type of bearings may be changed. The bearing may be, for example, a sliding bearing or the like.

As shown in FIG. 2, the bus bar assembly 40 is disposed axially above the stator 20. The bus bar assembly 40 has a power supply structure that supplies power from the outside of the motor 1 to the plurality of coils 22. As shown in FIG. 1 and FIG. 2, the bus bar assembly 40 includes a bus bar 41 and a bus bar holder 42. The bus bar assembly 40 has the plurality of bus bars 41 as described later. The bus bar holder 42 holds the plurality of bus bars 41. In the present embodiment, the bus bar assembly 40 holds the upper bearing 30a. Details of the bus bar assembly 40 will be described later.

The housing 50 surrounds and fixes the stator 20. As shown in FIG. 3, the housing 50 is a bottomed cylindrical member having a housing opening 50a on the axially upper side. In the present embodiment, the housing 50 is made of a metal. However, the housing 50 may be made of a material other than a metal such as a resin. As shown in FIG. 2 and FIG. 3, the housing 50 accommodates the rotor 10 and the stator 20.

As shown in FIG. 2, a cylindrical portion 51 having a diameter smaller than that of the housing opening 50a is provided in the center portion of the lower surface of the housing 50. The internal space of the housing 50 and the internal space of the cylindrical portion 51 are communicated. The lower bearing 30b is held by the cylindrical portion 51. As shown in FIG. 1 to FIG. 3, the housing 50 has a flange 52 that extends towards radially outside. In particular, the flange 52 is provided on the upper end of the housing 50. The flange 52 is a member identical to the housing 50. For example, the flange 52 is formed by bending the upper end of the housing 50.

As shown in FIG. 2 and FIG. 3, the intermediate member 60 is located between the stator 20 and the bus bar holder 42. As shown in FIG. 3, the intermediate member 60 has a lead wire holding portion 61 that holds a lead wire 222. According to the present configuration, workability can be improved because it is possible to connect the bus bar 41 and the lead wire 222 with the lead wire 222 fixed by the lead wire holding portion 61.

Note that the insulator 23 may be configured to have a lead wire holding portion that holds the lead wire 222. In this case, it is preferable that the lead wire holding portion is disposed on the upper portion of the insulator 23. Also in this case, workability can be improved because it is possible to connect the bus bar 41 and the lead wire 222 with the lead wire 222 fixed by the lead wire holding portion.

However, in the present embodiment, it is preferable that the lead wire holding portion is provided in the intermediate member 60. As described above, in the present embodiment, the stator core 21 is configured by combining the two members of the tooth portion 211P and the core back 212. In the case where the lead wire holding portion is provided in the insulator 23, when the tooth portion 211P to which the insulator 23 is attached and the core back 212 are combined, the lead wire holding portion is likely to hinder and make it difficult to insert the tooth portion 211P into the core back 212. By disposing the lead wire holding portion radially inside of the insulator 23, it is possible to avoid a contact between the lead wire holding portion and the core back 212. However, in this case, the lead wire holding portion is likely to hinder and make it difficult to wind the conductive wire 221 for constituting the coil 22 around the insulator 23. By having a configuration in which the lead wire holding portion 61 is provided in the intermediate member 60, these problems can be solved.

<2. Details of Bus Bar Assembly>

Figure 8:
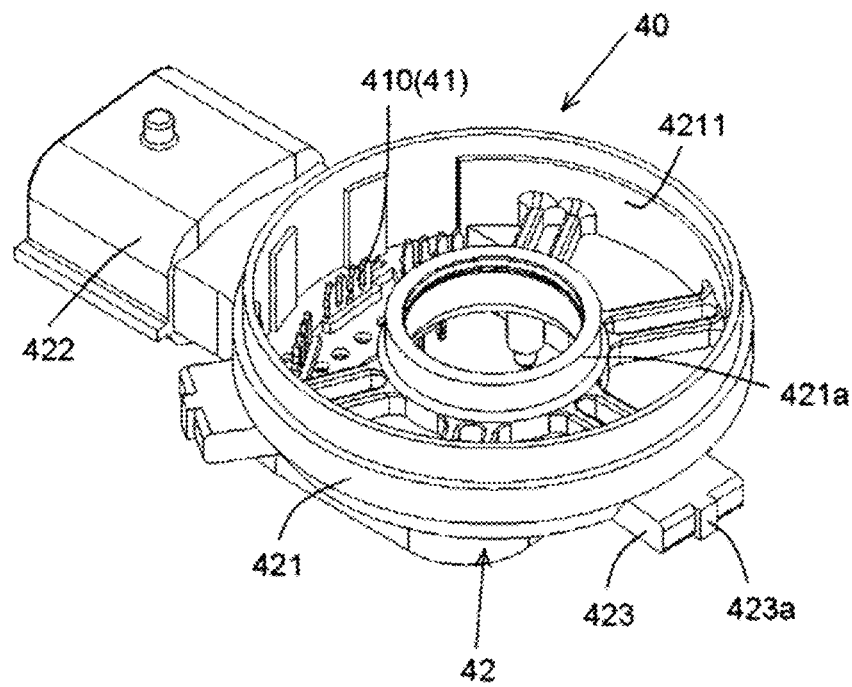
FIG. 8 is a perspective view of a bus bar assembly included in a motor according to an exemplary embodiment of the present invention.

FIG. 8 is a perspective view of the bus bar assembly 40 included in the motor 1 according to an embodiment of the present invention. Specifically, FIG. 8 is a perspective view as seen from the lower side. The bus bar 41 is made of a metal. The bus bar holder 42 is made of a resin. The bus bar assembly 40 is formed by insert molding the plurality of bus bars 41 and the bus bar holder 42. In the present embodiment, the number of the bus bars 41 is three. However, the number of the bus bars 41 may be plural, and the number of the bus bars 41 may be a number other than three.

As shown in FIG. 2 and FIG. 8, the bus bar holder 42 has a holder body portion 421 and a connector portion 422. The holder body portion 421 has a cup shape that opens downward. The outer circumference of the holder body portion 421 is circular. A tubular portion 421a is provided in the center portion of the holder body portion 421. The tubular portion 421a holds the upper bearing 30a.

The connector portion 422 extends from a part in the circumferential direction of the holder body portion 421 to a radial outside. The connector portion 422 has a connector opening 422a at the end portion of the radial outside. One end portion of each of the bus bars 41 is exposed inside of the holder body portion 421, and the other end portion is exposed to the outside via the connector opening 422a.

The bus bar 41 has a terminal portion 410 to be connected to the lead wire 222 drawn out from the coil 22. Specifically, the terminal portion 410 is provided at one end portion of the bus bar 41 and is exposed to the inner space of the holder body portion 421. In the present embodiment, the terminal portion 410 is formed by machining one end portion of the bus bar 41. In the present embodiment, the number of the terminal portions 410 is three. The three terminal portions 410 are arranged in the circumferential direction. In the case where the bus bar holder 42 is attached to the housing 50, each of the terminal portions 410 is disposed in a position facing the lead wire holding portion 61 in the axial direction.

Figure 9:
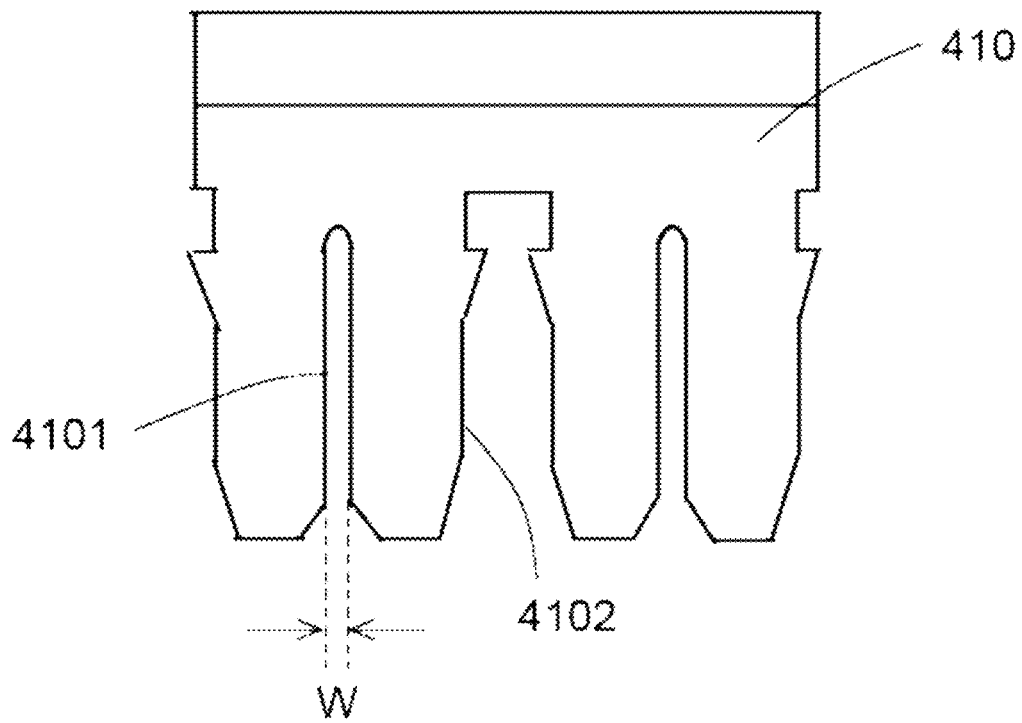
FIG. 9 is a plan view of a terminal portion provided at one end portion of a bus bar.

FIG. 9 is a plan view of the terminal portion 410 provided at one end portion of the bus bar 41. FIG. 9 is a view of the terminal portion 410 seen from the radial inside toward the radial outside. As shown in FIG. 9, the terminal portion 410 has a slit 4101 extending axially downward and fitted with the lead wire 222. A width W of the slit 4101 is narrower than the diameter of the lead wire 222. In detail, the slit 4101 linearly extends from an intermediate position to the lower end of the vertical direction of the terminal portion 410. In the present embodiment, each of the terminal portions 410 has the two slits 4101 disposed at intervals in the circumferential direction. That is, each of the terminal portions 410 is connected to the two lead wires 222. Between the two slits 4101 aligned in the circumferential direction, a dividing groove 4102 dividing the terminal portion 410 into two regions is provided. In the case where the bus bar holder 42 is attached to the housing 50, the circumferential position of each of the slits 4101 coincides with the circumferential position of each of the lead wires 222. Due to this, it is possible to fit each of the lead wires 222 into each of the slits 4101.

According to the present embodiment, by fitting the lead wire 222 drawn out from the coil 22 into the slit 4101, it is possible to easily and electrically connect the lead wire 222 and the bus bar 41. Therefore, it is possible to omit the work of welding the lead wire 222 and the bus bar 41. It should be noted that the lead wire 222 and the bus bar 41 may be welded together. However, since the width W of the slit 4101 is narrower than the diameter of the lead wire 222, it is possible to fix the lead wire 222 onto the terminal portion 410 by fitting the lead wire 222 into the slit 4101. Therefore, welding may be skipped.

Further, the lead wire 222 fitted into the slit 4101 may be fitted into the slit 4101 in a state where the insulating coating has been removed. In this case, it is configured so that the width W of the slit 4101 is smaller than the diameter of the lead wire 222 from which the insulating coating has been removed. However, the lead wire 222 fitted into the slit 4101 may be fitted into the slit 4101 without the insulating coating removed. Even in this case, by scraping off the insulating coating when the lead wire 222 is fitted into the slit 4101, an electrical connection between the terminal portion 410 and the lead wire 222 is obtained.

According to the present embodiment, since the bus bar assembly 40 has the plurality of terminal portions 410, by disposing the bus bar holder 42 in a predetermined location, it is possible to electrically connect the plurality of bus bars 41 and the plurality of lead wires 222 at the same time. In other words, according to the present embodiment, it is possible to improve the manufacturing efficiency of the motor 1 because it is possible to carry out the process of connecting the plurality of bus bars 41 to the lead wire 222 at the same time, not carrying out the process of connecting the plurality of bus bars 41 to the lead wire 222 one by one in sequence.

In the present embodiment, the lead wire 222 extending in the radial direction is fitted into the slit 4101. The lead wire 222 extending in the radial direction includes the lead wire 222 extending in a direction including the radial direction component. A part of the lead wire 222 is disposed and held in a direction extending in the radial direction by the lead wire holding portion 61. Note that the number of the lead wire holding portions 61 is the same as the number of the bus bars 41. In the present embodiment, as shown in FIG. 3, the number of the lead wire holding portions 61 is three. The three lead wire holding portions 61 are arranged in the circumferential direction. One of the lead wire holding portions 61 holds the two lead wires 222.

The slit 4101 has the width W of the circumferential direction that is narrower than the diameter of the lead wire 222. In the slit 4101, the portion, held by the lead wire holding portion 61, of the lead wire 222 is fitted. As described above, the plurality of terminal portions 410 are arranged in the circumferential direction. That is, the plurality of slits 4101 are arranged in the circumferential direction. In addition, the portions, held by the lead wire holding portion 61, of the plurality of lead wires 222 are aligned in the circumferential direction. The circumferential position of each of the slits 4101 and the circumferential position of each of the lead wires 222 fitted in each of the slits 4101 coincide. Due to this, it is possible to simultaneously fit each of the lead wires 222 into each of the slits 4101 by lowering the bus bar holder 42 disposed above the stator 20 toward the stator 10. That is, it is possible to improve the manufacturing efficiency of the motor 1 because it is possible to simultaneously carry out the electrical connection between the plurality of bus bars 41 and the plurality of lead wires 222.

As shown in FIG. 8, the bus bar holder 42 has a protrusion 423 protruding radially outward. Specifically, the protrusion 423 is provided on the outer circumferential surface of the holder body portion 421. In the present embodiment, the number of the protrusions 423 is three. However, the number of the protrusions 423 may be changed. The housing 50 has a recess portion recessed radially outward or a radially penetrating hole portion or notch portion. At least a part of the protrusion 423 is fitted into the recess portion, the hole portion, or the notch portion. According to this, it is possible to carry out a circumferential positioning of the bus bar assembly 40 with respect to the stator 20 by the protrusion 423 and the recess portion, the hole portion or the notch portion. Due to this, it is possible to easily connect the terminal portion 410 and the lead wire 222.

In the present embodiment, for example, as shown in FIG. 1 and FIG. 3, the housing 50 has a notch portion 53. The flange 52 has an extending portion 54 axially extending in the outer circumference. The extending portion 54 is a member identical to the flange 52. In particular, the flange 52 has the pair of extending portions 54 disposed at intervals in the circumferential direction. The notch portion 53 is a gap between the pair of extending portions 54. In the present embodiment, the number of the pairs of extending portions 54 is the same as the number of the protrusions 423, which is three. The plurality of the pairs of extending portions 54 are arranged in the circumferential direction. In the case where the notch portion 53 is constituted by the pair of extending portions 54, since the position of the notch portion 53 becomes easy to see, it is possible to efficiently carry out the work of fitting at least a part of the protrusion 423 into the notch portion 53.

In the present embodiment, a part of the protrusion 423 is fitted into the notch portion 53. As shown in FIG. 8, the protrusion 423 has a protruding portion 423a protruding radially outward on an end face of the radial outside. The protruding portion 423a is fitted into the notch portion 53. Further, in the case where the housing 50 has a recess portion or a through hole instead of the notch portion 53, the recess portion or the through hole may be provided on the side wall of the housing 50, for example.

The flange 52 has a claw portion 55 that protrudes radially inward from the extending portion 54 and contacts the upper surface of the protrusion 423. The claw portion 55 protrudes radially inward from the upper end of the extending portion 54 in detail. The claw portion 55 is a member identical to the extending portion 54. The claw portion 55 is obtained, for example, by bending the upper portion of the extending portion 54 extending axially upward at a substantially right angle after the protruding portion 423a is fitted into the notch portion 53. By the contact between the claw portion 55 and the protrusion 423, it is possible to prevent the bus bar holder 42 from being lifted upward and to carry out an axial positioning of the bus bar assembly 40 with respect to the stator 20.

In the present embodiment, the bus bar holder 42 is in contact with the upper surface of the stator core 21. In detail, the holder body portion 421 has a holder rib 4211 that protrudes radially inward from the inner circumferential surface on the inner circumference. The lower surface of the holder rib 4211 comes into contact with the upper surface of the core back 212. According to the present configuration, it is possible to carry out an axial positioning of the bus bar assembly 40 by the stator core 21. It is possible to easily manage the dimensional tolerance because the axial positioning of the bus bar assembly 40 with respect to the stator 20 is carried out by using a part of the stator 20.

However, the axial positioning of the bus bar holder 42 with respect to the stator 20 may be carried out using another portion. The axial positioning may be carried out with, for example, a configuration in which the lower surface of the protrusion 423 is in contact with the upper surface of the flange 52. According to the present configuration, it is possible to reduce the work load for positioning because it is possible to carry out the circumferential and axial positioning of the bus bar assembly 40 with respect to the stator 20 using the same protrusion 423.

<3. Details of Intermediate Member>

As shown in FIG. 3, the intermediate member 60 has an annular portion 62 and a rib 63. The intermediate member 60 is made of, for example, a resin. The annular portion 62 is provided with the lead wire holding portion 61 on its upper surface. In the present embodiment, the number of the lead wire holding portions 61 is plural, more specifically, three. The annular portion 62 is circular. The plurality of lead wire holding portions 61 are arranged in the circumferential direction.

Figure 10:
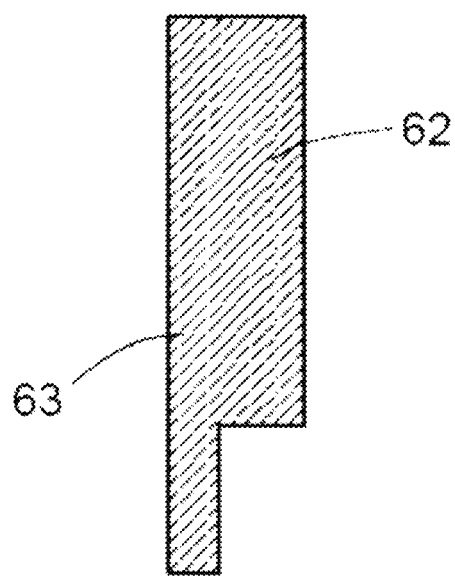
FIG. 10 is a vertical sectional view of a portion of an intermediate member included in a motor according to an exemplary embodiment of the present invention.

FIG. 10 is a vertical sectional view of a part of the intermediate member 60 included in the motor 1 according to an embodiment of the present invention. As shown in FIG. 3 and FIG. 10, the rib 63 protrudes radially inward from the inner circumferential surface of the annular portion 62. Further, the rib 63 protrudes downward from the axial lower end of the annular portion 62. The annular portion 62 and the rib 63 are a single member. The plurality of ribs 63 are provided. The plurality of ribs 63 are arranged at intervals in the circumferential direction.

Figure 11:
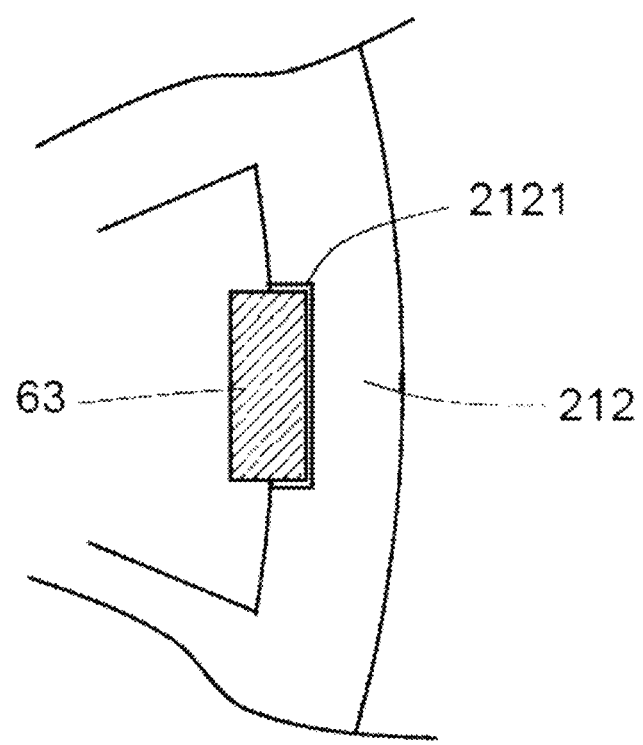
FIG. 11 is a view for explaining the relationship between the intermediate member and the stator.

FIG. 11 is a view for explaining the relationship between the intermediate member 60 and the stator 20. As shown in FIG. 11, the core back 212 has a groove portion 2121 recessed radially outward on the inner circumferential surface and extending in the axial direction. More specifically, the plurality of grooves 2121 are provided. The plurality of grooves 2121 are arranged at intervals in the circumferential direction. In a state where the intermediate member 60 is disposed on the upper surface of the core back 212, the rib 63 is fitted into the groove portion 2121. More specifically, each of the plurality of ribs 63 is fitted into the separate groove 2121.

According to the present configuration, it is possible to carry out the circumferential and radial positioning of the intermediate member 60 by the groove portion 2121 provided in the core back 212. Due to this, the lead wire 222 held by the lead wire holding portion 61 provided in the intermediate member 60 can be accurately fitted into the slit 4101 of the terminal portion 410.

Figure 12:
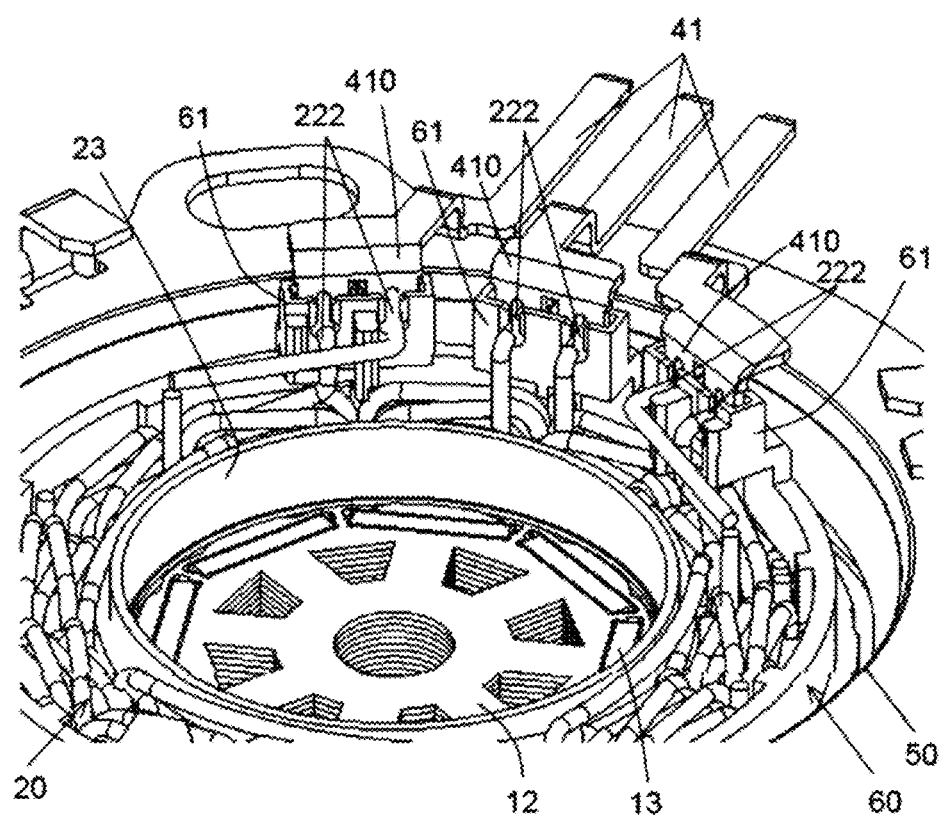
FIG. 12 is an enlarged view of a lead wire holding portion and its surroundings.
Figure 13:
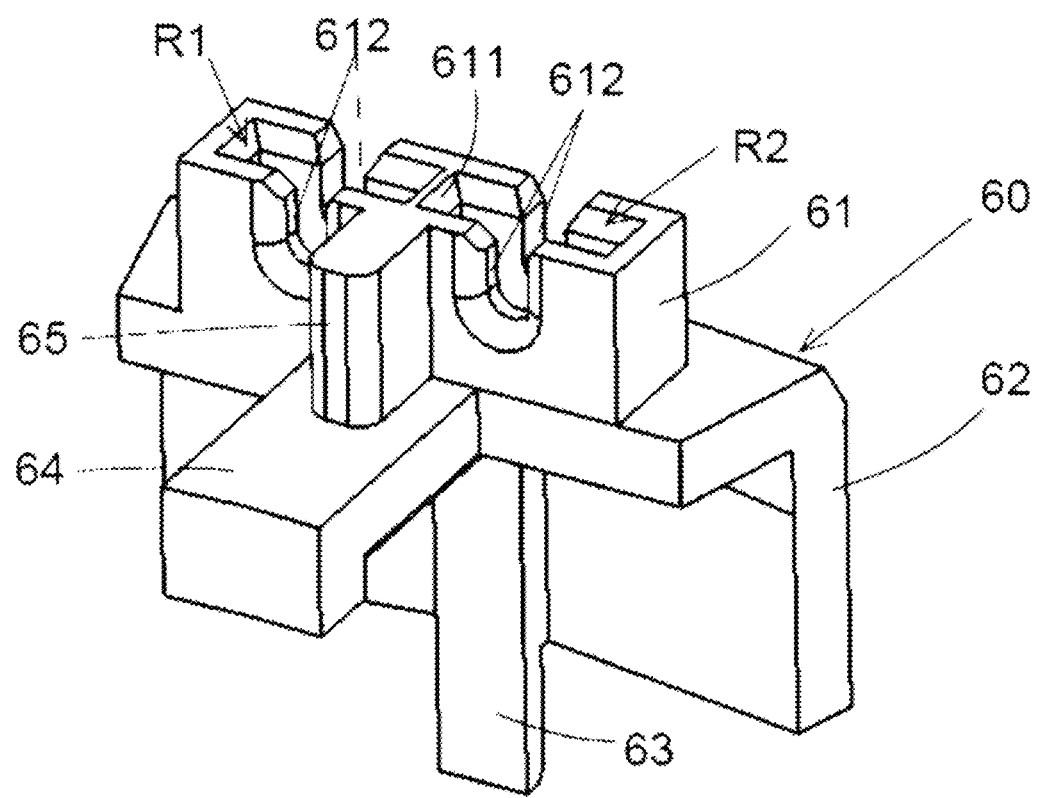
FIG. 13 is a further enlarged perspective view of the lead wire holding portion and its surroundings.

FIG. 12 is an enlarged view of the lead wire holding portion 61 and its surroundings. FIG. 13 is a further enlarged perspective view of the lead wire holding portion 61 and its surroundings. In FIG. 13, only the configuration included in the intermediate member 60 is shown.

As shown in FIG. 12 and FIG. 13, the lead wire holding portion 61 has a box shape. Specifically, the lead wire holding portion 61 has a rectangular shape in plan view from the axial direction. The lead wire holding portion 61 has a wall portion 611. The wall portion 611 bisects the inner space of the lead wire holding portion 61 in the circumferential direction. The wall portion 611 separates the plurality of lead wires 222 from each other. In the present embodiment, the wall portion 611 separates the two lead wires 222.

The lead wire holding portion 61 has two regions R1 and R2 separated by the wall portion 611. Each of the regions R1 and R2 has a notch groove 612 provided by cutting out a wall surface orthogonal to the radial direction into a U shape. Each of the regions R1 and R2 has the two notch grooves 612 disposed at intervals in the radial direction. Each of the lead wires 222 is held in the lead wire holding portion 61 in a state of being fitted into the two notch grooves 612 aligned in the radial direction. The lead wire holding portion 61 holds the plurality of lead wires 222. Specifically, each of the lead wire holding portions 61 holds the two lead wires 222 extending in the radial direction. As shown in FIG. 12, in a state where the lead wire 222 is fitted into the slit 4101, most of the terminal portion 410 is inserted into the lead wire holding portion 61.

As shown in FIG. 13, it is preferable that the intermediate member 60 has a first overhanging portion 64 protruding radially inward at a position in the circumferential direction where the lead wire holding portion 61 is provided. It is preferable that the first overhanging portion 64 is located lower than the lead wire holding portion 61. The first overhanging portion 64 may, for instance, protrude to the upper end of the insulator 23 positioned radially inward and contact the insulator 23.

According to the present configuration, it is possible to improve the rigidity of the intermediate member 60 by increasing the radial thickness of the intermediate member 60 at the position where the lead wire holding portion 61 is provided. Due to this, when the terminal portion 410 is inserted into the lead wire holding portion 61 and the lead wire 222 is fitted into the slit 4101, it is possible to suppress deformation of the intermediate member 60. In the configuration shown in FIG. 12, the first overhanging portion 64 is omitted, and such a configuration may be adopted.

As shown in FIG. 13, it is preferable that the intermediate member 60 has a second overhanging portion 65 that protrudes radially inward from the lead wire holding portion 61. It is preferable that the second overhanging portion 65 is formed on a surface facing radially inward of the lead wire holding portion 61. The second overhanging portion 65 is located above the first overhanging portion 64. In the present embodiment, the second overhanging portion 65 is a rectangular parallelepiped shape that has a rounded corner at the radial inside and extends from the lower end to the upper end of the lead wire holding portion 61.

By providing the second overhanging portion 65, it is possible to guide the plurality of lead wires 222 held by the lead wire holding portion 61 to an appropriate holding position while avoiding contact with each other. It is preferable that the second overhanging portion 65 is located radially inside the wall portion 611. According to the present configuration, it is possible to provide the second overhanging portion 65 at a portion where the rigidity of the lead wire holding portion 61 is high. Further, since the wall portion 611 is provided at a position where the two regions R1 and R2 are bisected, it is possible to guide the lead wire 222 to the holding position with good balance by disposing the second overhanging portion 65 on the radial inside of the wall portion 611.

In the configuration shown in FIG. 12, the second overhanging portion 65 is not provided in the lead wire holding portion 61 provided at the center among the three lead wire holding portions 61 aligned in the circumferential direction. This is out of consideration that it is less likely for the lead wires 222 to come into contact with each other when the two lead wires 222 are guided to the lead wire holding portion 61. However, the second overhanging portion 65 may also be provided in the lead wire holding portion 61.

<4. Points to be Noted>

The configuration of the above-described embodiment is merely an example of the present invention. The configuration of the embodiment may be appropriately changed without exceeding the technical idea of the present invention. Further, it is also possible to implement a plurality of modified examples appropriately described above by appropriately combining them within a possible range.

Exemplary embodiments of the present invention can be widely applied to, for example, motors used for home appliances, automobiles, ships, aircrafts, trains, and the like. Exemplary embodiments of the present invention can be applied to, for example, a motor for an electric oil pump.

While preferred embodiments of the present invention have been described above, it is to be understood that variations and modifications will be apparent to those skilled in the art without departing from the scope and spirit of the present invention. The scope of the present invention, therefore, is to be determined solely by the following claims.

What is claimed is:

1. A motor, comprising:
   a rotor including a shaft centered on a vertically extending center axis;
   a stator radially opposite to the rotor and including a plurality of coils;
   a bearing supporting the shaft;
   a bus bar assembly on an upper side of the stator in an axial direction; and
   a housing surrounding and fixing the stator; wherein
   the bus bar assembly includes a bus bar holder holding a plurality of bus bars;
   the stator includes a terminal portion connected to a lead wire drawn out from one of the plurality of coils;
   the terminal portion includes a slit which extends axially and into which the lead wire is fitted; and
   a width of the slit is narrower than a diameter of the lead wire;
   the bus bar holder includes a protrusion protruding radially outside;
   the housing includes a recess portion recessed radially outward or a radially penetrating hole portion or notch portion; and
   at least a portion of the protrusion is fitted into the recess portion, the hole portion, or the notch portion.

2. The motor according to claim 1, wherein
   the housing includes a flange extending radially outward; and
   a lower surface of the protrusion is in contact with an upper surface of the flange.

3. The motor according to claim 1, wherein
   the stator includes an annular stator core; and
   the bus bar holder is in contact with an upper surface of the stator core.

4. The motor according to claim 3, wherein
   the housing includes a flange extending radially outward; and
   the flange includes:
      an extending portion extending in an axial direction on an outer circumference; and
      a claw portion protruding radially inward from the extending portion and being in contact with an upper surface of the protrusion.

5. The motor according to claim 4, wherein
   the flange includes a pair of the extending portions provided at intervals in a circumferential direction;
   the housing includes the notch portion; and
   the notch portion is a gap between the pair of extending portions.

6. The motor according to claim 1, wherein
   the stator includes an insulator between the coil and a tooth around which a conductive wire defining the coil is wound; and
   the insulator includes a lead wire holding portion that holds the lead wire.

7. The motor according to claim 1, further comprising:
   an intermediate member positioned between the stator and the bus bar holder; wherein
   the intermediate member includes a lead wire holding portion that holds the lead wire.

8. The motor according to claim 7, wherein the stator includes:
   teeth around which a conductive wire defining the coil is wound, and which are arranged in a circumferential direction; and
   an annular core back located radially outside of the plurality of teeth;
   the core back includes a groove portion recessed radially outward and axially extending on a circumferential surface;
   the intermediate member includes:
      an annular portion provided with the lead wire holding portion on an upper surface thereof; and
      a rib protruding radially inward from a circumferential surface of the annular portion and protruding downward from an axially lower end of the annular portion; and
   the rib is fitted into the groove portion.

9. The motor according to claim 7, wherein the intermediate member includes a first overhanging portion protruding radially inward in a circumferential position where the lead wire holding portion is provided.

10. The motor according to claim 7, wherein
    the lead wire holding portion holds a plurality of the lead wires; and
    the intermediate member includes a second overhanging portion protruding radially inward from the lead wire holding portion.

11. The motor according to claim 10, wherein
    the lead wire holding portion includes a wall portion separating the plurality of lead wires from each other; and
    the second overhanging portion is located radially inside of the wall portion.

* * * * *